US009041772B2

(12) United States Patent
Suh et al.

(10) Patent No.: US 9,041,772 B2
(45) Date of Patent: May 26, 2015

(54) BROADCAST TRANSMITTER, BROADCAST RECEIVER, AND 3D VIDEO DATA PROCESSING METHOD THEREOF

(75) Inventors: Jong Yeul Suh, Anyang-si (KR); Jeong Hyu Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 817 days.

(21) Appl. No.: 13/263,284

(22) PCT Filed: Jan. 19, 2010

(86) PCT No.: PCT/KR2010/000336
§ 371 (c)(1), (2), (4) Date: Oct. 6, 2011

(87) PCT Pub. No.: WO2010/117129
PCT Pub. Date: Oct. 14, 2010

(65) Prior Publication Data

US 2012/0019619 A1 Jan. 26, 2012

Related U.S. Application Data

(60) Provisional application No. 61/167,518, filed on Apr. 7, 2009.

(51) Int. Cl.
*H04N 13/00* (2006.01)
*H04N 19/597* (2014.01)

(52) U.S. Cl.
CPC ......... *H04N 13/0059* (2013.01); *H04N 19/597* (2014.11)

(58) Field of Classification Search
CPC .................... H04N 19/00769; H04N 13/0059; H04N 13/00; H04N 13/0022; H04N 13/0242; H04N 13/0207; G02B 23/2415
USPC ........................................................... 348/43
See application file for complete search history.

(56) References Cited

U.S. PATENT DOCUMENTS

| | | | | |
|---|---|---|---|---|
| 4,704,627 | A * | 11/1987 | Yuyama et al. | 348/43 |
| 5,260,773 | A * | 11/1993 | Dischert | 348/42 |
| 5,751,927 | A * | 5/1998 | Wason | 345/419 |
| 5,949,390 | A * | 9/1999 | Nomura et al. | 345/32 |
| 6,359,664 | B1 * | 3/2002 | Faris | 349/15 |
| 6,598,233 | B1 * | 7/2003 | Choi | 725/151 |
| 2002/0158969 | A1 * | 10/2002 | Gupta | 348/180 |
| 2004/0047594 | A1 * | 3/2004 | Towler | 386/46 |

(Continued)

FOREIGN PATENT DOCUMENTS

| | | | |
|---|---|---|---|
| CN | 1698376 | A | 11/2005 |
| CN | 1954606 | A | 4/2007 |

(Continued)

*Primary Examiner* — Shan Elahi
(74) *Attorney, Agent, or Firm* — McKenna Long & Aldridge LLP

(57) ABSTRACT

A three dimensional (3D) video data processing method in a broadcast transmitter includes encoding, by an encoder, 3D video data which carries a first image and a second image in separate video streams; generating, by a system information processor, system information comprising 3D video composition information about the 3D video data; multiplexing, by a multiplexer, the system information and the 3D video data; and transmitting, by a transmitting unit, a broadcast signal carrying the 3D video data and the system information. The 3D video composition information includes first information on resolution of the 3D video data.

8 Claims, 10 Drawing Sheets

(56) References Cited

U.S. PATENT DOCUMENTS

| | | | | |
|---|---|---|---|---|
| 2004/0244052 | A1* | 12/2004 | Kim | 725/126 |
| 2004/0250290 | A1* | 12/2004 | Kim | 725/126 |
| 2004/0268412 | A1* | 12/2004 | Kim | 725/126 |
| 2005/0244050 | A1* | 11/2005 | Nomura et al. | 382/154 |
| 2005/0264651 | A1* | 12/2005 | Saishu et al. | 348/51 |
| 2006/0064716 | A1* | 3/2006 | Sull et al. | 725/37 |
| 2006/0126177 | A1* | 6/2006 | Kim et al. | 359/465 |
| 2006/0285011 | A1* | 12/2006 | Yun | 348/465 |
| 2007/0256098 | A1* | 11/2007 | Yum | 725/38 |
| 2008/0266453 | A1* | 10/2008 | Fisher | 348/516 |
| 2008/0310499 | A1* | 12/2008 | Kim et al. | 375/240.01 |
| 2010/0315493 | A1* | 12/2010 | Hamada | 348/51 |
| 2011/0267423 | A1* | 11/2011 | Suh et al. | 348/42 |
| 2012/0300031 | A1* | 11/2012 | Horlander | 348/43 |
| 2013/0322544 | A1* | 12/2013 | Horlander | 375/240.16 |

FOREIGN PATENT DOCUMENTS

| | | | | |
|---|---|---|---|---|
| WO | 2007-064159 | A1 | 6/2007 | |
| WO | WO 2007/067020 | A1 | 6/2007 | |
| WO | WO 2007067020 | A1 * | 6/2007 | H04N 13/00 |
| WO | WO 2009/027923 | A1 | 3/2009 | |
| WO | WO 2009027923 | A1 * | 3/2009 | H04N 13/00 |

* cited by examiner

Fig. 2

| Syntax | No. of Bits | Format |
|---|---|---|
| terrestrial_virtual_channel_table_section() { | | |
| table_id | 8 | OxC8 |
| section_syntax_indicator | 1 | '1' |
| private_indicator | 1 | '1' |
| reserved | 2 | '11' |
| section_length | 12 | uimsbf |
| transport_stream_id | 16 | uimsbf |
| reserved | 2 | '11' |
| version_number | 5 | uimsbf |
| current_next_indicator | 1 | bslbf |
| section_number | 8 | uimsbf |
| last_section_number | 8 | uimsbf |
| protocol_version | 8 | uimsbf |
| num_channels_in_section | 8 | uimsbf |
| for(i=0; i<num_channels_in_sectino; i++) { | | |
| short_ name | 7*16 | uimsbf |
| reserved | 4 | '1111' |
| major_channel_number | 10 | uimsbf |
| minor_channel_number | 10 | uimsbf |
| modulation_mode | 8 | uimsbf |
| carrier_frequency | 32 | uimsbf |
| channel_TSID | 16 | uimsbf |
| program_number | 16 | uimsbf |
| ETM_location | 2 | uimsbf |
| access_controlled | 1 | bslbf |
| hidden | 1 | bslbf |
| reserved | 2 | '11' |
| hide_guide | 1 | bslbf |
| reserved | 3 | '111' |
| service_type (2010) | 6 | uimsbf |
| source_id | 16 | uimsbf |
| reserved | 6 | '1111' |
| descriptors_length | 10 | uimsbf |
| for(i=0; i<N; i++) { | | |
| descriptor() (2020) | | |
| } | | |
| } | | |
| reserved | 6 | '111111' |
| additional_descriptors_length | 10 | uimsbf |
| for(j=0; j<N; j++) { | | |
| additional_descriptor() | | |
| } | | |
| CRC_32 | 32 | rpchof |
| } | | |

Fig. 3

| Syntax | No. of Bits | Format |
|---|---|---|
| 3DTV_service_location_descriptor_VCT ( ) { | | |
| descriptor_tag | 8 | 0xTBD |
| descriptor_length | 8 | uimsbf |
| reserved | 3 | '111' |
| PCR_PID | 13 | uimsbf |
| reserved | 1 | '1' |
| number_elements | 7 | uimsbf |
| for (j=0; j<number_elements; j++) { | | |
| elementary_PID | 13 | uimsbf |
| left_right_view | 1 | bslbf |
| primary_video_flag | 1 | bslbf |
| reserved | 1 | '1' |
| stream_type | 8 | uimsbf |
| resolution_type | 2 | uimsbf |
| stereo_format_type | 6 | uimsbf |
| filter_type | 8 | uimsbf |
| number_horizontal_taps = a | 8 | uimsbf |
| for (k=0; k < a; k++) { | | |
| hor_coefficient_den | 8 | simsbf |
| hor_coefficient_num | 8 | uimsbf |
| } | | |
| number_vertical_taps = b | 8 | uimsbf |
| for (k=0; k < b; k++) { | | |
| ver_coefficient_den | 8 | simsbf |
| ver_coefficient_num | 8 | uimsbf |
| } | | |
| } | | |
| } | | |

| Syntax | No. of Bits | Format |
|---|---|---|
| 3DTV_service_location_descriptor_VCT ( ) { | | |
| descriptor_tag | 8 | 0xTBD |
| descriptor_length | 8 | uimsbf |
| reserved | 3 | '111' |
| PCR_PID | 13 | uimsbf |
| reserved | 1 | '1' |
| number_elements | 7 | uimsbf |
| for (j=0; j<number_elements; j++) { | | |
| elementary_PID | 13 | uimsbf |
| left_right_view | 1 | bslbf |
| primary_video_flag | 1 | bslbf |
| reserved | 1 | '1' |
| stream_type | 8 | uimsbf |
| resolution_type | 2 | uimsbf |
| stereo_format_type | 6 | uimsbf |
| filter_type | 8 | uimsbf |
| number_horizontal_taps = a | 8 | uimsbf |
| number_vertical_taps = b | 8 | uimsbf |
| for (k=0; k < a * b; k++) { | | |
| coefficient_den; | 8 | simsbf |
| coefficient_num; | 8 | uimsbf |
| } | | |
| } | | |
| } | | |

| Syntax | No. of Bits | Format |
|---|---|---|
| TS_program_map_section() { | | |
| table_id | 8 | uimsbf |
| section_syntax_indicator | 1 | bslbf |
| '0' | 1 | bslbf |
| reserved | 2 | bslbf |
| section_length | 12 | uimsbf |
| program_number | 16 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| reserved | 3 | bslbf |
| PCR_PID | 13 | uimsbf |
| reserved | 4 | bslbf |
| program_info_length | 12 | uimsbf |
| for(i=0; i<N; i++) { | | |
| descriptor() | | |
| } | | |
| for(i=0; i<N1; i++) { | | |
| stream_type | 8 | uimsbf |
| reserved | 3 | bslbf |
| elementary_PID | 13 | uimsbf |
| | | |
| reserved | 4 | bslbf |
| ES_info_length | 12 | uimsbf |
| for(i=0; i<N2; i++) { | | |
| descriptor() | | |
| } 5010 | | |
| } | | |
| CRC_32 | 32 | rpchof |
| } | | |

Fig. 6

| Syntax | No. of Bits | Format |
|---|---|---|
| 3DTV_service_location_descriptor_PMT ( ) { | | |
| descriptor_tag | 8 | 0xTBD |
| descriptor_length | 8 | uimsbf |
| left_right_view | 8 | uimsbf |
| reserved | 7 | bslbf |
| primary_video_flag | 1 | bslbf |
| resolution_type | 2 | uimsbf |
| stereo_format_type | 6 | uimsbf |
| filter_type | 8 | uimsbf |
| number_horizontal_taps | 8 | uimsbf |
| for (k=0; k < number_horizontal_taps; k++) { | | |
| hor_coefficient_den | 8 | simsbf |
| hor_coefficient_num | 8 | uimsbf |
| } | | |
| number_vertical_taps | 8 | uimsbf |
| for (k=0; k < number_vertical_taps; k++) { | | |
| ver_coefficient_den | 8 | simsbf |
| ver_coefficient_num | 8 | uimsbf |
| } | | |
| } | | |

BROADCAST TRANSMITTER, BROADCAST RECEIVER, AND 3D VIDEO DATA PROCESSING METHOD THEREOF

This application is a National Stage Entry of International Application No. PCT/KR2010/000336, filed on Jan. 19, 2010, and claims the benefit of U.S. Provisional Application No. 61/167,518, filed Apr. 7, 2009, both of which are hereby incorporated by reference for all purposes as if fully set forth herein in their entireties.

TECHNICAL FIELD

The present invention relates to a broadcast receiver and a three dimensional (3D) video data processing method thereof, and more particularly to a broadcast receiver, a broadcast receiver, and a 3D video data processing method thereof, which can process information of video data when a 3D broadcast system transmits two video streams for stereoscopic display.

BACKGROUND ART

Generally, a three dimensional (3D) image (or a stereoscopic image) provides a user's eyes with a stereoscopic effect using the stereoscopic visual principle. A human being feels both near and far through a binocular parallax caused by a distance between their eyes spaced apart from each other by about 65 mm, such that the 3D image enables both right and left eyes to respectively view associated planar images, resulting in the stereoscopic effect and the perspective effect.

The above-mentioned 3D image display method may be classified into a stereoscopic scheme, a volumetric scheme, a holographic scheme, etc. In case of using the stereoscopic scheme, the 3D image display method provides a left view image to be viewed by the left eye and a right view image to be viewed by the right eye, such that the user's left eye views the left view image and the user's right eye views the right view image through either polarization glasses or a display device, resulting in recognition of the 3D image effect.

DISCLOSURE OF INVENTION

Technical Problem

Accordingly, the present invention is directed to a broadcast transmitter, a broadcast receiver and a 3D video data processing method, that substantially obviate one or more problems due to limitations and disadvantages of the related art.

An object of the present invention is to provide a broadcast transmitter, a broadcast receiver, and a 3D video data processing method, which transmit and receive 3D video data information when a 3D broadcast system transmits two video streams for stereoscopic display, and process the 3D video data using the broadcast transmitter and the broadcast receiver, and thus providing a user with more effective and convenient broadcast environments.

Solution to Problem

The object of the present invention can be achieved by providing a three dimensional (3D) video data processing method including processing, by a video formatter, encoded 3D video data, encoding, by an encoder, 3D video data, generating, by a system information processor, system information having 3D video composition information that includes information about the processing of 3D video data and the encoding of 3D video data, multiplexing, by a multiplexer, the system information and the 3D video data, and transmitting, by a transmitting unit, a broadcast signal.

In another aspect of the present invention, provided herein is a three dimensional (3D) video data processing method including receiving, by a receiving unit, a broadcast signal including 3D video data and system information, obtaining, by a system information processor, 3D video composition information by parsing the system information, decoding, by a decoder, the 3D video data according to the 3D video composition information, and formatting and outputting, by an output formatter, the decoded 3D video data according to the 3D video composition information.

In another aspect of the present invention, provided herein is a broadcast transmitter including a video formatter for processing encoded three dimensional (3D) video data, an encoder for encoding 3D video data, a system information processor for generating system information having 3D video composition information that includes information about the processing of 3D video data and the encoding of 3D video data, a multiplexer for multiplexing the system information and the 3D video data, and a transmitting unit for transmitting a broadcast signal.

In another aspect of the present invention, provided herein is a broadcast receiver including a receiving unit for receiving a broadcast signal including three dimensional (3D) video data and system information, a system information processor for obtaining 3D video composition information by parsing the system information, a decoder for decoding the 3D video data according to the 3D video composition information, and an output formatter for formatting and outputting the decoded 3D video data according to the 3D video composition information.

Advantageous Effects of Invention

According to embodiments of the present invention, the broadcast receiver can process 3D video data such that a 3D effect intended by a 3D broadcast service provider is reflected in the 3D broadcast service.

In addition, the embodiments of the present invention can effectively provide a 3D broadcast service simultaneously while minimizing the effect on a conventional 2D broadcast service.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 2 shows a syntax structure of a Terrestrial Virtual Channel Table (TVCT) including 3D video composition information according to one embodiment of the present invention.

FIG. 3 shows a syntax structure of a 3DTV service location descriptor acting as 3D video composition information according to one embodiment of the present invention.

FIG. 4 shows a syntax structure of a 3DTV service location descriptor acting as 3D video composition information according to one embodiment of the present invention.

FIG. 5 shows a syntax structure of a Program Map Table (PMT) including 3D video composition information according to one embodiment of the present invention.

FIG. 6 shows a syntax structure of a 3DTV service location descriptor acting as 3D video composition information according to one embodiment of the present invention.

BEST MODE FOR CARRYING OUT THE INVENTION

Figure 1:
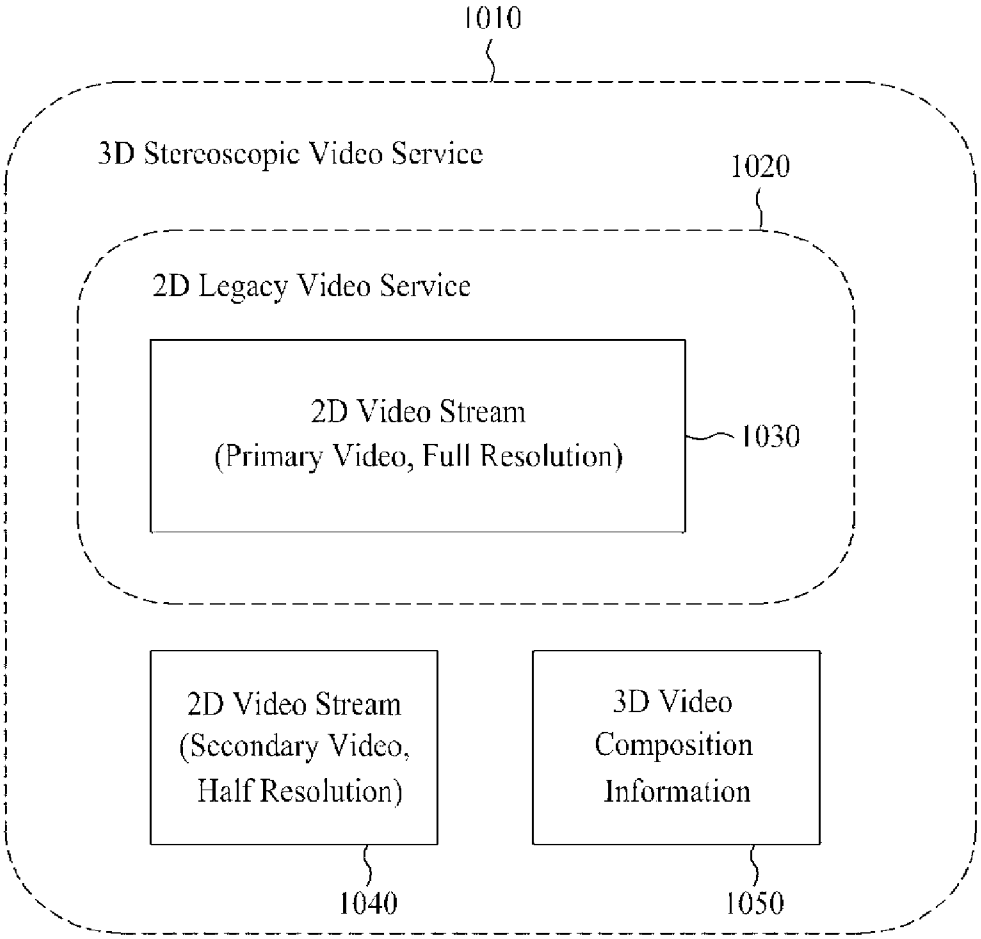
FIG. 1 is a conceptual diagram illustrating a data structure of a 3D broadcast service according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

The 3D image display method includes a stereoscopic imaging scheme in which two view points are considered and a multi-view imaging scheme in which three or more view points are considered. In contrast, a single view image scheme shown in the related art may also be referred to as a monoscopic image scheme.

The stereoscopic imaging scheme is designed to use one pair of right and left view images acquired when a left-side camera and a right-side camera spaced apart from each other by a predetermined distance capture the same target object. The multi-view imaging scheme uses three or more images captured by three or more cameras spaced apart by a predetermined distance or angle. Although the following description discloses embodiments of the present invention using the stereoscopic imaging scheme as an example, the inventive concept of the present invention may also be applied to the multi-view imaging scheme.

A stereoscopic image or multi-view image may be compressed and coded according to a variety of methods including a Moving Picture Experts Group (MPEG) scheme, and transmitted to a destination.

For example, a stereoscopic image or a multi-view image may be compressed and coded according to the H.264/Advanced Video Coding (AVC) scheme, and transmitted. In this case, the reception system may decode a received image in reverse order of the H.264/AVC coding scheme, such that it is able to obtain the 3D image.

In addition, one of a left view image and a right view image of a stereoscopic image or one of multiple-view images may be assigned to an image of a base layer, and the remaining one may be assigned to an image of an extended layer. The base layer image may be encoded using the same method as the monoscopic imaging method. In association with the extended layer image, only information of the relationship between the base layer image and the extended layer image may be encoded and transmitted. As an exemplary compression coding scheme for the base layer image, a JPEG, an MPEG-2, an MPEG-4, or a H.264/AVC scheme may be used. For convenience of description, the H.264/AVC scheme may be exemplarily used in one embodiment of the present invention. In one embodiment of the present invention, the compression coding scheme for an image of an upper or higher layer may be set to the H.264/Multi-view Video Coding (MVC) scheme.

A conventional terrestrial DTV transmission/reception standard is based on 2D video content. Therefore, in order to provide 3D TV broadcast content, a transmission/reception standard for 3D video content must be additionally defined. The broadcast receiver receives a broadcast signal according to the added transmission/reception standard, and properly processes the received broadcast signal, such that it can support the 3D broadcast service.

A conventional DTV transmission/reception standard according to embodiments of the present invention will hereinafter be described using an Advanced Television Systems Committee (ATSC) standard as an example.

The ATSC system includes specific information for processing broadcast content in system information, and transmits the resultant system information including the specific information. For example, the system information may be called service information. The system information includes channel information, program information, event information and the like. The ATSC standard includes the aforementioned system information in a Program Specific Information/Program and System Information Protocol (PSI/PSIP), and can transmit and receive the resultant PSI/PSIP including the system information. However, the scope and spirit of the present invention are not limited to the above-mentioned examples. If it is assumed that there is a protocol capable of transmitting the system information in a table format, the scope and spirit of the present invention can also be applied to other examples irrespective of titles of the system information.

The PSI is disclosed only for illustrative purposes and better understanding of the present invention. The PSI may include a Program Association Table (PAT), a Program Map Table (PMT), and the like The PAT corresponds to specific information which is transmitted by a packet having a PID of '0'. The PMT transmits a program identification number, packet identifier (PID) information of a transport stream packet in which individual bit streams of video and audio data constituting a program are transmitted, and PID information in which a PCT is transmitted. In addition, in the case where the PMT acquired from the PAT is parsed, information regarding correlation among constituent elements of a program can be acquired.

The PSIP may include, for example, a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), a Master Guide Table (MGT), and the like.

The VCT transmits information about a virtual channel, for example, channel information for selecting a channel and information about a packet identifier (PID) for receiving audio- and/or video-data. That is, when the VCT is parsed, a channel name, a channel number, and the PID of the audio and video data of a broadcast program carried in the channel can be known. The STT transmits current date and time information, and the RRT transmits information about a region and a deliberative council for a program rating level. The ETT transmits an additional description about a channel and a broadcast program, and the EIT transmits information about an event of a virtual channel. The DCCT/DCCSCT transmits information about an automatic channel change, and the MGT transmits version- and PID-information of individual tables contained in the PSIP.

The ATSC system supports 2D video data according to a full high definition (HD) scheme. In order to provide 3D broadcast service using the ATSC system, it is necessary to transmit extended view video data for the 3D broadcast service with base view video data for the 2D broadcast service. In this case, the base view video data for the 2D broadcast service must be transmitted at full resolution, such that it can be compatible with the 2D legacy device and protects the 2D broadcast service from adverse impact.

Hereinafter, video data or a video stream for the 2D broadcast service corresponds to primary video data or a primary video stream. Video data or a video stream that is additionally transmitted to the primary video data or primary video stream so as to implement the 3D broadcast service may be referred to as secondary video data or a secondary video stream, respectively.

Due to the broadcast system resource allocation problems such as bandwidth restrictions, it may be difficult for secondary video data to be transmitted at full resolution in the same manner as primary video data. Therefore, the secondary video data may be transmitted at half resolution, and may be transmitted using another compression scheme and another codec that are different from those of the related art.

In this case, in order to allow the broadcast receiver to effectively process the received 3D video data, it is necessary to transmit not only the signaling information of secondary video data but also additional information associated with the secondary video data using the PSI and PSIP. In addition, additional information associated with added secondary video data may include resolution information, codec information, compression information, filtering information used for resizing, and the like.

FIG. 1 is a conceptual diagram illustrating a data structure of a 3D broadcast service according to one embodiment of the present invention.

Constituent components of the 3D broadcast service will hereinafter be described using a stereoscopic display as an example.

Referring to FIG. 1, the 3D stereoscopic video service 1010 includes a 2D legacy video service 1030. An additional 3D video service may also be provided as necessary. However, the reason why the 3D stereoscopic video service 1010 includes the 2D legacy video service 1030 is to maintain compatibility between the 3D stereoscopic video service and the 2D legacy video service 1030, so that the 3D stereoscopic video service 1010 can use an infrastructure for the 2D legacy video service and broadcast transmission and reception devices that are currently used. The 2D legacy video service 1030 includes transmission and reception of the 2D video stream 1030. In accordance with one embodiment of the present invention, the 2D video stream may be a primary video stream, and may be transferred at full resolution.

In order to implement the 3D stereoscopic video service 1010, an additional video stream in addition to the 2D video stream 1030 contained in the 2D legacy video service 1030 must be transmitted. In FIG. 1, the additional video stream is denoted by a 2D video stream 1040. In accordance with one embodiment of the present invention, the additional video stream 1040 may be a secondary video stream, and may be transferred at half resolution.

In FIG. 1, resolution of each of the primary video stream and the secondary video stream has been disclosed only for illustrative purposes, and various resolution combinations may be obtained, for example, a half-resolution primary video stream, a half-resolution secondary video stream, a full-resolution primary video stream, and a full-resolution secondary video stream.

In order to allow the 3D stereoscopic video service 1010 to display a 3D image using two video streams, information of a 3D stereoscopic video service and various information of the two video streams must be additionally transmitted and received. In FIG. 1, the aforementioned information of the 3D stereoscopic video service 1010 is denoted by the 3D video composition information 1050, and the 3D video composition information will hereinafter be described in detail.

In accordance with one embodiment of the present invention, the 3D video composition information for the 3D broadcast service may be contained in the PSI/PSIP of the ATSC system. In this case, the 3D video composition information may be included in PMT information of the PSI or TVCT information of the PSIP.

FIG. 2 shows a syntax structure of a Terrestrial Virtual Channel Table (TVCT) including 3D video composition information according to one embodiment of the present invention. Detailed descriptions of individual fields contained in the TVCT shown in FIG. 2 are as follows.

A ‘table_id’ field is an 8-bit unsigned integer number field that indicates the type of table section.

A ‘section_syntax_indicator’ field is a one-bit field which shall be set to ‘1’ for the ‘terrestrial_virtual_channel_table_section( )’ field.

A ‘private_indicator’ field is a one-bit field which shall be set to ‘1’.

A ‘section_length’ field is a 12-bit field in which the first two bits shall be set to ‘00’, and specifies the number of bytes of the section, starting immediately following the ‘section_length’ field, and including the CRC.

A ‘transport_stream_id’ field indicates the 16-bit MPEG-2 Transport Stream (TS) ID. The ‘transport_stream_id’ field distinguishes a Terrestrial Virtual Channel Table (TVCT) from others that may be broadcast in different PTCs.

A ‘version_number’ field serving as a 5-bit field indicates a version number of the Virtual Channel Table (VCT).

A ‘current_next_indicator’ field is a one-bit indicator. In the case where the ‘current_next_indicator’ field is set to ‘1’, this means that a transmitted Virtual Channel Table (VCT) is currently applicable. When a bit of the ‘current_next_indicator’ field is set to ‘0’, this means that the transmitted table is not yet applicable and shall be the next table to become valid.

A ‘section_number’ field is an 8-bit field which gives the number of this section.

A ‘last_section_number’ field serving as an 8-bit field specifies the number of the last section (that is, the section with the highest section_number value) of the complete Terrestrial Virtual Channel Table (TVCT).

A ‘protocol_version’ field serving as an 8-bit unsigned integer field is used to allow, in the future, the table type to carry parameters that may be structured differently than those defined in the current protocol.

A 'num_channels_in_section' field serving as an 8-bit field specifies the number of virtual channels in this VCT section.

A 'short_name' field may indicate the name of the virtual channel, represented as a sequence of one to seven 16-bit code values interpreted in accordance with the UTF-16 standard for unicode character data.

A 'major_channel_number' field indicates a 10-bit number that represents the 'major' channel number associated with the virtual channel being defined in this iteration of the 'for' loop.

A 'minor_channel_number' field indicates a 10-bit number in the range from '0' to '999' so as to represent the 'minor' or 'sub' channel number. This 'minor_channel_number' field together with the 'major_channel_number' field may indicate a two-part channel number, where the minor_channel_number represents the second or right-hand part of the number.

A 'modulation_mode' field including an 8-bit unsigned integer may indicate a modulation mode for the transmitted carrier associated with the virtual channel.

A 'carrier_frequency' field may indicate an allowed carrier frequency.

A 'channel_TSID' field is a 16-bit unsigned integer field in the range from 0x0000 to 0xFFFF. The 'channel_TSID' field represents an MPEG-2 Transport Stream (TS) ID associated with the Transport Stream (TS) carrying the MPEG-2 program referenced by the virtual channel.

A 'program_number' field includes a 16-bit unsigned integer that associates the virtual channel being defined here with the MPEG-2 program association and TS program map tables.

An 'ETM_location' field serving as a 2-bit field specifies the existence and the location of an Extended Text Message (ETM).

An 'access_controlled' field indicates a 1-bit Boolean flag. When the Boolean flag of the 'access_controlled' field is set, this means that accessing the events associated with a virtual channel may be controlled.

A 'hidden' field indicates a 1-bit Boolean flag. When the Boolean flag of the 'hidden' field is set, this means that the virtual channel is not accessed by a user by a direct entry of the virtual channel number.

A 'hide_guide' field indicates a Boolean flag. When the Boolean flag of the hide_guide' field is set to zero '0' for a hidden channel, this means that the virtual channel and virtual channel events may appear in EPG displays.

A 'service_type' field is a 6-bit enumerated type field that shall identify the type of service carried in the virtual channel.

A 'source_id field' includes a 16-bit unsigned integer that identifies the programming source associated with the virtual channel.

A 'descriptors_length' field may indicate a total length (in bytes) of descriptors for a virtual channel.

A 'descriptor( )' field may include zero or more descriptors determined to be appropriate for the 'descriptor( )' field.

An 'additional_descriptors_length' field may indicate a total length (in bytes) of a VCT descriptor list.

A 'CRC__32' field is a 32-bit field which contains a CRC value that ensures a zero output of registers in the decoder defined in Annex A of ISO/IEC 138181 "MPEG-2 Systems" [8] after processing the entire Terrestrial Virtual Channel Table (TVCT) section.

The 'service_type' field 2010 may indicate that a broadcast service provided from a corresponding channel is a 3D broadcast service. In accordance with one embodiment, if the 'service_type' field 2010 has a field value of 0x11, it can be recognized that a corresponding virtual channel provides a 3D broadcast program (including an audio stream, a video stream, and an additional video stream for displaying the 3D stereoscopic image). If the 'service_type' field indicates the 3D broadcast service, the broadcast receiver must parse information of two video streams (including primary video stream and secondary video stream) and the 3DTV service location descriptor.

The descriptor field 2020 includes 3D video composition information acting as information of two video streams constructing the stereoscopic video service, and a detailed description thereof will be given hereinafter.

FIG. 3 shows a syntax structure of a 3DTV service location descriptor acting as 3D video composition information according to one embodiment of the present invention.

In FIG. 3, the 3DTV service location descriptor is contained in the TVCT, and performs signaling of information of 3D video components constructing a corresponding virtual channel. A detailed description of fields contained in the 3DTV service location descriptor is as follows.

A 'number_elements' field indicates the number of video elements constructing a corresponding virtual channel. The broadcast receiver receives the 3DTV service location descriptor, and can parse following fields as many times as the number of video elements constructing the corresponding virtual channel.

An elementary_PID field indicates a packet identifier (PID) of a corresponding video element. The 3DTV service location descriptor may define the following information related to video elements each having a PID of the 'elementary_PID' field. The broadcast receiver may acquire 3D video display information of a video element having a corresponding PID from the 3DTV service location descriptor.

A 'left_right_view_flag' field may indicate whether a corresponding video element is a left view image or a right view image.

A 'primary_video_flag' field may indicate whether a corresponding video element is video data that can be displayed even on the 2D legacy device. In accordance with one embodiment, if a flag value is set to '1', this flag means primary video data. If a flag value is set to '0', this flag means half-resolution secondary video data.

A 'stream_type' field may indicate a coding type of a corresponding video stream. As an exemplary coding type, a JPEG, an MPEG-2, an MPEG-4, an H.264/AVC, or an H.264/AVC scheme may be used.

A 'resolution_type' field may indicate resolution information of a corresponding video element. In case of the secondary video data, the 'resolution_type' field may indicate whether corresponding video data corresponds to a full resolution or a half resolution in a horizontal or vertical direction. The 'resolution_type' field may have the following values as an example.

"00"—Full-Resolution

"01"—Vertically Half-Resolution

"10"—Horizontally Half-Resolution

"11"—Half in both Horizontal and Vertical directions (Quarter-Resolution)

A 'stereo_format_type' field may indicate which format must be applied to a multiplexing process of primary video data and secondary video data. A variety of stereoscopic display formats may be used, for example, a side-by-side scheme, a top-bottom scheme, a checkerboard scheme, a vertical line interlace scheme, a horizontal line interlace scheme, and a frame sequential scheme, and the like. In accordance with one embodiment, if a broadcast receiver or a display device supports only the half resolution based format for right- and left-video data, the broadcast receiver or the display device can recognize recommended stereoscopic display format information using the 'stereo_format_type' field.

The 'filter_type' field may indicate filtering information when video data is resized. For example, if a doubling process for enabling half-resolution secondary video data to be scaled into primary video data is performed, or if full-resolution primary video data is cut in half in a manner that half-resolution secondary video data can be scaled into half-resolution primary video data, the 'filter_type' field may indicate type information of a used filter. In accordance with one embodiment, if video data is resized, the 'filter_type' field may indicate an application direction of a filter (e.g., a horizontal direction or a vertical direction), information of a resizing ratio (e.g., doubling or half-reducing), filter types (e.g., bilinear interpolation, bicubic interpolation, etc.), and the like. The filtering information contained in the 'filter_type' field may also be called resizing information.

Filter information fields 3010 may indicate filtering information when different filtering processes are performed according to filter types.

First, a 'number_horizontal_taps' field may indicate the size of a filter applied to a horizontal filtering process, and may also indicate the number of parameters of the filter. In FIG. 3, for convenience of description and better understanding of the present invention, it is assumed that a field value is set to 'a' and this field having the value of 'a' may be denoted along with the 'number_horizontal_taps' field.

A 'hor_coefficient_den' field or a 'hor_coefficient_num' field may indicate a filter coefficient. Each filter coefficient may be set to the resultant value acquired when a value of the 'hor_coefficient_den' field is divided by a value of the 'hor_coefficient_num' field (i.e., Filter Coefficient=hor_coefficient_den/hor_coefficient_num).

Subsequently, the 'number_vertical_taps' field may indicate either the size of a filter applied when the vertical filtering is performed, or the number of parameters of the filter. In FIG. 3, for convenience of description and better understanding of the present invention, it is assumed that a field value is set to 'b' and this field having the value of 'b' may be denoted along with the 'number_vertical_taps' field.

A 'ver_coefficient_den' field or a 'ver_coefficient_num' field may indicate a filter coefficient. Each filter coefficient may be set to the resultant value acquired when a value of the 'ver_codefficient_den' field is divided by a value of the 'ver_coefficient_num' field (i.e., Filter Coefficient=ver_coefficient_den/ver_coefficient_num).

The filter information 3010 shown in FIG. 3 may represent a horizontal filtering process and a vertical filtering process. Such filter information can be implemented in various ways.

FIG. 4 shows a syntax structure of a 3DTV service location descriptor acting as 3D video composition information according to one embodiment of the present invention.

FIG. 4 shows a syntax structure in which filter information 4010 is implemented differently from FIG. 3. The remaining fields other than the filter information 4010 are identical to those of FIG. 3.

The filter information fields 4010 shown in FIG. 4 may indicate a window-shaped filtering differently from the horizontal filtering and the vertical filtering of FIG. 3. In FIG. 3, the horizontal filtering is defined using the 'number_horizontal_taps' field and filter coefficients thereof, and the vertical filtering is defined using the 'number_vertical_taps' field and filter coefficients thereof. In FIG. 4, the 'number_horizontal_taps' field, the 'number_vertical_taps' field, and filter coefficients thereof are defined so that the window-shaped filtering is defined. In other words, FIG. 3 shows filter information defined when the filtering is carried out on the basis of a line, and FIG. 4 shows filter information defined when the filtering is carried out on the basis of a surface.

The 'number_horizontal_taps' field may indicate a horizontal filter size and may be set to 'a'. The 'number_vertical_taps' field may indicate a vertical filter size, and may be set to 'b'. In other words, filter information fields shown in FIG. 4 show filtering information based on a window that has a horizontal size 'a' and a vertical size 'b'.

The 'coefficient_den' field or the 'coefficient_num' field may indicate a filter coefficient. Each filter coefficient may be set to the resultant value acquired when a value of the 'coefficient_den' field is divided by a value of the 'coefficient_num' field (i.e., Filter Coefficient=coefficient_den/coefficient_num).

FIG. 5 shows a syntax structure of a Program Map Table (PMT) including 3D video composition information according to one embodiment of the present invention. Detailed descriptions of individual fields contained in the PMT shown in FIG. 5 are as follows.

A 'table_id' field is an 8-bit field which shall always be set to '0x02' in a 'TS_program_map_section' field.

A 'section_syntax_indicator' field is a 1-bit field which shall be set to '1'.

A 'section_length' field is a 12-bit field in which first two bits shall be set to '00', and specifies the number of bytes of the section starting immediately the 'section_length' field, and including the CRC.

A 'program_number' field is a 16-bit field, which specifies the program to which the 'program_map_PID' field is applicable.

A 'version_number' field is a 5-bit field, which indicates the version number of the 'TS_program_map_section' field.

A 'current_next_indicator' field is a 1-bit field. When a bit of the 'current_next_indicator' field is set to '1', this means that the transmitted 'TS_program_map_section' field is currently applicable. When a bit of the 'current_next_indicator' field is set to '0', this means that the transmitted 'TS_program_map_section' field is not yet applicable and shall be the next 'TS_program_map_section' field to become valid.

A 'section_number' field includes a value of an 8-bit field which shall be '0x00'.

A 'last_section_number' field includes a value of an 8-bit field which shall be '0x00'.

A 'PCR_PID' field is a 13-bit field indicating the PID of the Transport Stream (TS) packets which shall contain the PCR fields valid for the program specified by a 'program_number' field. In the case where no PCR is associated with a program definition for private streams, then this field shall take the value of '0x1FFF'.

A 'program_info_length' field is a 12-bit field, the first two bits of which shall be '00'. The 'program_info_length' field specifies the number of bytes of descriptors immediately following the 'program_info_length' field.

A 'stream_type' field is an 8-bit field specifying the type of elementary stream or payload carried within packets with the PID whose value is specified by the 'elementary_PID' field. In addition, the 'stream_type' field may indicate a coding type of a corresponding video element. As an exemplary coding type, a JPEG, an MPEG-2, an MPEG-4, an H.264/AVC, or an H.264/AVC scheme may be used.

An 'elementary_PID' field is a 13-bit field specifying a PID of the Transport Stream (TS) packets which carry the associated elementary stream or payload. This PID may be used as a PID of primary video data or secondary video data.

An 'ES_info_length' field is a 12-bit field, the first two bits of which shall be '00'. The 'ES_info_length' field may specify the number of bytes of descriptors of the associated elementary stream immediately following the 'ES_info_length' field.

A 'CRC_32' field is a 32-bit field which contains a CRC value that gives a zero output of registers in the decoder defined in Annex B after processing the entire Transport Stream program map section.

The descriptor field 5010 includes information of two video streams constituting a stereoscopic video service, and a detailed description of the descriptor field 5010 is as follows.

FIG. 6 shows a syntax structure of a 3DTV service location descriptor acting as 3D video composition information according to one embodiment of the present invention.

The 3DTV service location descriptor shown in FIG. 6 is contained in the PMT, and performs signaling of information about 3D video components constituting a corresponding program. Fields of the 3DTV service location descriptor contained in the PMT shown in FIG. 6 are similar to those of the 3DTV service location descriptor contained in the TVCT shown in FIG. 3 or 4, and description of the same fields will herein be omitted for convenience of description. However, in accordance with the PMT, the 'stream_type' field and the 'elementary_PID' information in association with the video element are contained in the PMT in a different way from the TVCT, and descriptions of these fields shown in FIG. 6 are identical to those of FIG. 5.

3D video composition information may be configured in the form of a table, and the table-format 3D video composition information is contained in system information, and is then transmitted. However, in accordance with another embodiment of the present invention, 3D video composition information may be contained in a video elementary stream (ES), and the resultant video ES including the 3D video composition information is transmitted. In this case, the transmitter may transmit 3D video composition information through Supplemental Enhancement Information (SEI) contained in the video ES.

Next, a method for controlling a reception system to process primary video data and secondary video data using the 3D video composition information so as to reconstruct stereoscopic video data will hereinafter be described in detail. In this case, it is assumed that transmission video data is full-resolution primary video data or half-resolution secondary video data.

In accordance with one embodiment, a method for multiplexing a half-resolution left view image and a half-resolution right view image will hereinafter be described in detail.

The broadcast receiver may acquire stereo-format-type information through 3D video composition information, and performs ½ resizing on primary video data using filter information about primary video data. The broadcast receiver may combine the resized half-resolution primary video data with the half-resolution secondary video data by referring to stereo format information and the like, so that it may reconstruct stereoscopic video data. Thereafter, format conversion and the like can be carried out according to a display type of the broadcast receiver.

A method for multiplexing a full-resolution left view image and a full-resolution right view image according to another embodiment of the present invention will hereinafter be described in detail.

The broadcast receiver may acquire stereo format type information through 3D video composition information, and may double secondary video data using filter information about secondary video data. In addition, the broadcast receiver may combine full-resolution primary video data with the doubled full-resolution secondary video data by referring to stereo format information and the like, so that it can reconstruct stereoscopic video data. Thereafter, format conversion and the like can be carried out according to a display type of the broadcast receiver.

In addition to the aforementioned embodiments, the broadcast receiver may receive primary video data having various resolutions and secondary video data, and may perform filtering using 3D video composition information, so that it can process stereoscopic video data having various resolutions.

Figure 7:
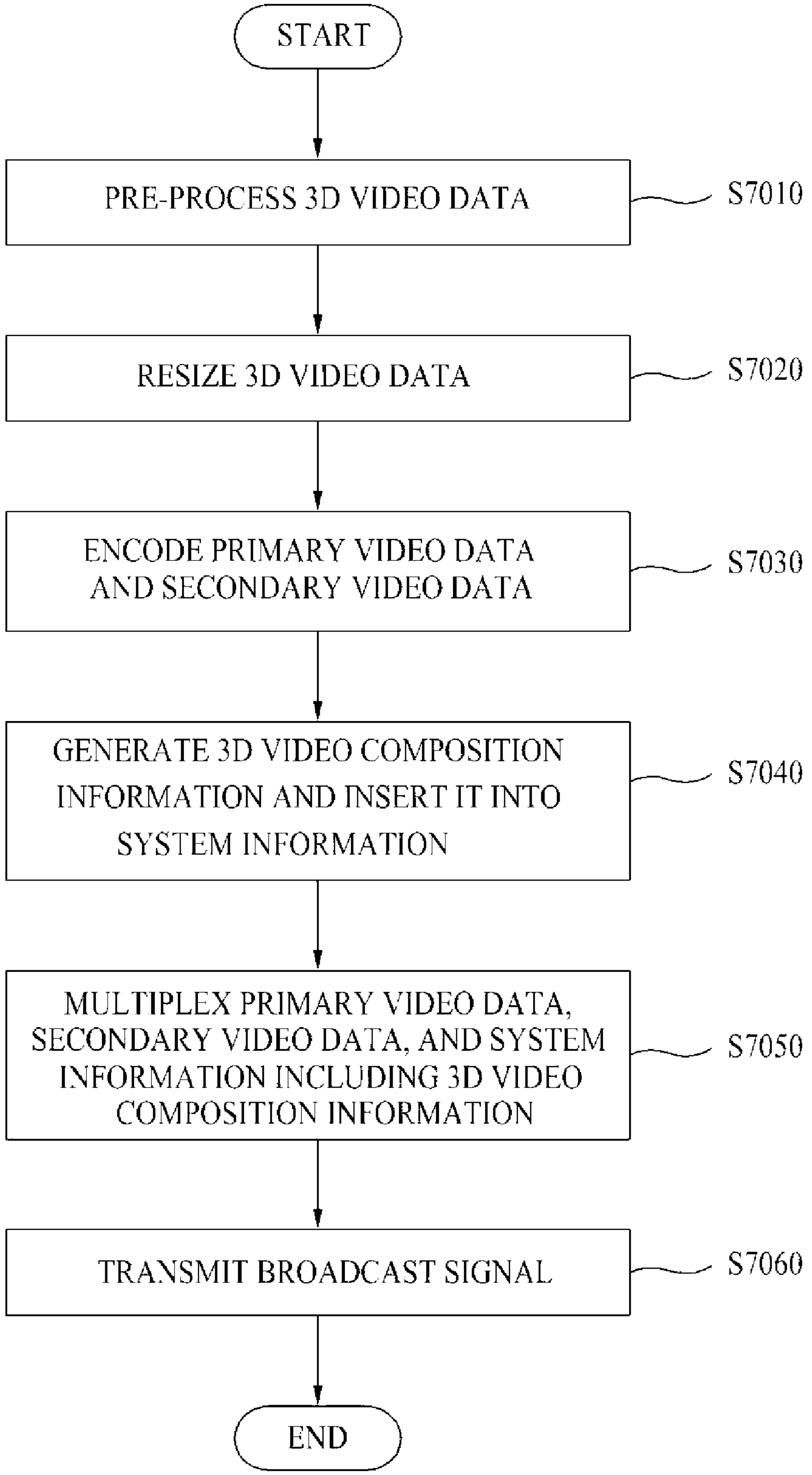
FIG. 7 is a flowchart illustrating a method for processing and transmitting a broadcast signal including 3D video composition information according to one embodiment of the present invention.

FIG. 7 is a flowchart illustrating a method for processing and transmitting a broadcast signal including 3D video composition information according to one embodiment of the present invention.

Referring to FIG. 7, the broadcast transmitter may receive video data captured at two viewpoints, and may perform pre-processing of the received video data at step S7010. The broadcast transmitter may perform image processing (e.g., viewpoint allocation or the like) on video data of two viewpoints, so that it outputs primary video data that can be displayed on the 2D legacy broadcast receiver and secondary video data for displaying a 3D image on the 3D broadcast receiver.

The broadcast transmitter may resize 3D video data at step S7020. The broadcast transmitter may resize video data having been encoded at a predetermined size and resolution, in consideration of bandwidth allocation, transmission/reception system, and the like. In accordance with one embodiment, the broadcast transmitter may output primary video data at full resolution, and may resize the secondary video data into half-resolution video data and output the resultant half-resolution video data.

The broadcast transmitter may encode the primary video data and the secondary video data at step S7030. In accordance with one embodiment, the broadcast transmitter can encode each of the primary video data and the secondary video data using the MPEG-2 video coding scheme and the H.264/AVC or H.265/MVC coding scheme, etc.

The broadcast transmitter may generate 3D video composition information, and the generated 3D video composition information is inserted into system information at step S7040. In accordance with one embodiment, the 3D video composition information may include identification (ID) information for identifying whether video data is primary video data or secondary video data, coding information used for encoding of video data, resolution information of corresponding video data, stereoscopic display format information for indicating each multiplexing format of the primary video data and the secondary video data, and resizing information (filter information) used for the receiver that performs resizing in response to the resizing of the transmitter.

The system information includes the PSI/PSIP. In accordance with one embodiment, the broadcast transmitter may include video composition information in the PMT or TVCT of the system information.

The broadcast transmitter may multiplex primary video data, secondary video data, and system information at step S7050, and transmit the multiplexed broadcast signals at step S7060.

Figure 8:
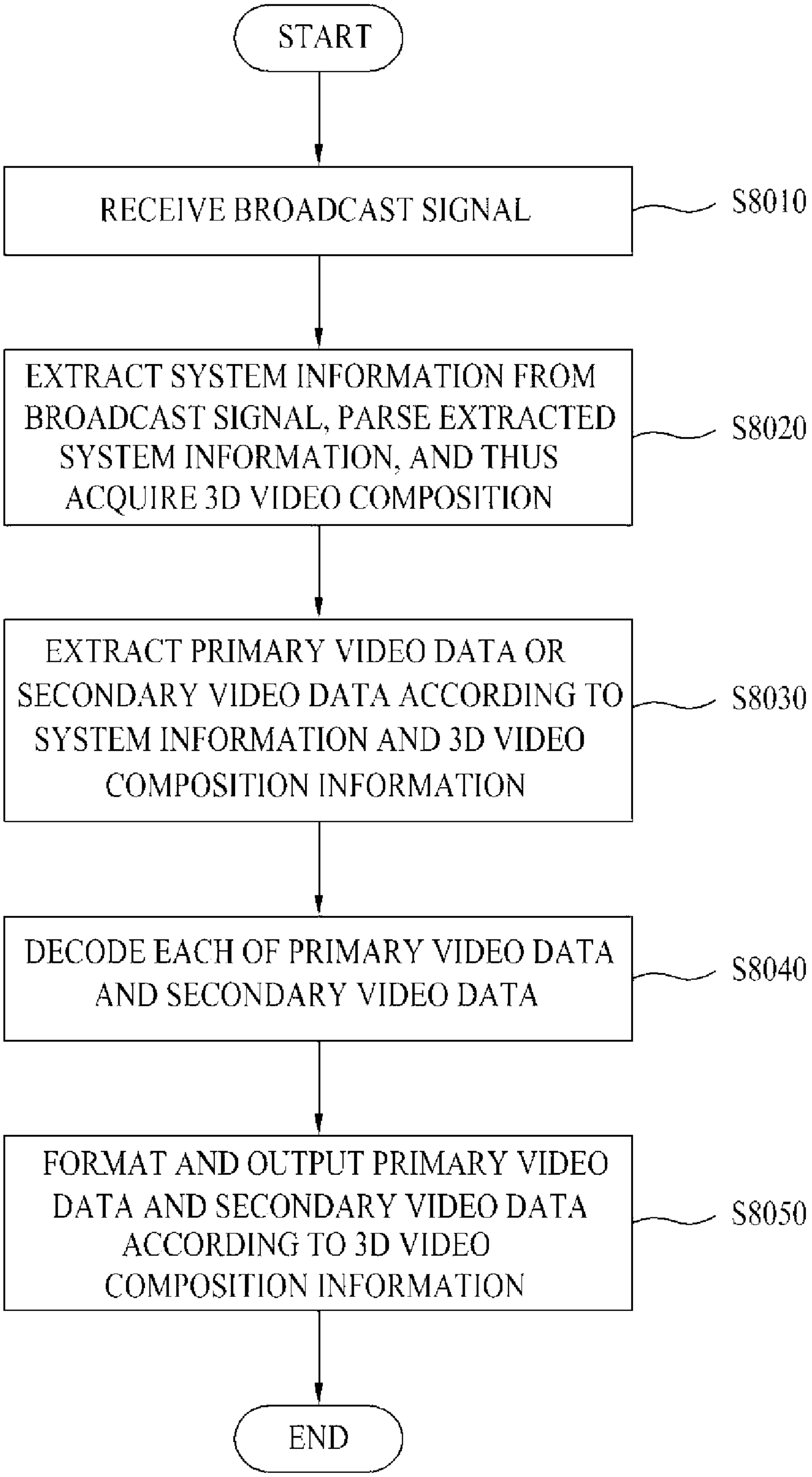
FIG. 8 is a flowchart illustrating a method for receiving and processing a broadcast signal including 3D video composition information according to one embodiment of the present invention.

FIG. 8 is a flowchart illustrating a method for receiving and processing a broadcast signal including 3D video composition information according to one embodiment of the present invention.

Referring to FIG. 8, the broadcast receiver receives a broadcast signal by tuning a channel at step S8010.

The broadcast receiver extracts system information by demultiplexing the received broadcast signal, and obtains 3D video composition information by parsing the extracted system information at step S8020. The broadcast receiver may acquire 3D composition information by parsing the TVCT or PMT contained in the system information.

The broadcast receiver extracts primary video data or secondary video data from the broadcast signal according to the system information and the 3D video composition information at step S8030. The broadcast receiver determines whether the 3D video composition information is present in the system information, so that it can determine whether or not the 3D broadcast service is provided on the basis of the presence or absence of the 3D video composition information. If the 3D broadcast service is not provided, the broadcast receiver can extract primary video data according to the system information. If the 3D broadcast service is provided, the broadcast receiver can extract the primary video data or the secondary video data.

The broadcast receiver may decode each of the primary video data and the secondary video data according to the obtained 3D video composition information at step S8040. If a user views video data in a 2D mode, or if the 3D broadcast service is not provided, the broadcast receiver may only decode the extracted primary video data.

The broadcast receiver formats the decoded primary video data and the decoded secondary video data according to the 3D video composition information, and outputs the formatted video data at step S8030.

A variety of methods for formatting the decoded primary video data and the decoded secondary video data, and outputting the formatted video data may be used. In accordance with one embodiment, in order to output video data of a spatially multiplexed format (e.g., side-by-side, top-bottom, line interlacing, or the like) according to display capacity/type information, the broadcast receiver may perform resizing of the video data according to the 3D video composition information, such that it can format and output the resultant video data.

In accordance with another embodiment, in order to output video data of a temporally multiplexed format (e.g., frame sequential, field sequential, or the like) according to display capacity/type information, the broadcast receiver may perform resizing of the video data according to the 3D video composition information, such that it can format and output the resultant video data. In addition, the broadcast receiver may perform frame rate conversion in response to a frame rate supported by the display device, and output the converted result. Formatting the video data may include a resampling process and an interpolating process. In addition, according to the above-mentioned method, the broadcast receiver according to this embodiment of the present invention may adjust resolution through the resizing process, and format the stereoscopic display, such that it can output video data. Formatting 3D video data may be carried out according to stereoscopic display format information contained in the 3D video composition information. Resizing video data may be carried out through filter information contained in the 3D video composition information as described above.

Steps S8020 and S8030 may be carried out in different embodiments according to either one case wherein 3D video composition information is contained in the TVCT of the system information or another case wherein the 3D video composition information is contained in the PMT.

First, an embodiment obtained when the 3D video composition information is contained in the TVCT will hereinafter be described in detail.

The broadcast receiver may determine whether or not a corresponding virtual channel provides the 3D broadcast service using the 'service_type' field of the TVCT.

If the 3D broadcast service is provided, the broadcast receiver can obtain 'elementary_PID' information of the primary video data (PID_P) or the secondary video data (PID_S) using the service location descriptor or the 3DTV service location descriptor. The broadcast receiver receives and extracts the primary video data and the secondary video data according to individual PID information. The broadcast receiver processes the primary video data and the secondary video data using information contained in the 3DTV service location descriptor, such that it outputs a 3D video image.

If the 3D broadcast service is not provided, or if the user views video data in a 2D mode, the broadcast receiver receives and extracts primary video data, and decodes and outputs the resultant primary video data.

Hereinafter, an embodiment obtained when 3D video composition information is contained in the PMT will hereinafter be described in detail.

The broadcast receiver determines whether a corresponding stream includes primary video data and secondary video data corresponding to the 'stream_type' field, the 'elementary_PID' field, and each elementary stream of the PMT, using the 3DTV service location descriptor corresponding to the 'stream_type' field, the 'elementary_PID' field, and each elementary stream of the PMT. In this case, it is determined whether or not a corresponding program provides a 3D broadcast service on the basis of the presence or absence of the 3DTV service location descriptor.

The broadcast receiver may obtain 'PID_P' corresponding to the primary video data and 'PID_S' corresponding to the secondary video data from the PMT. In addition, the broadcast receiver may obtain information needed for formatting the primary video data and the secondary video data from the 3DTV service location descriptor.

The broadcast receiver may perform mapping between video data and information having been provided through the TVCT using the 'program_number' field, and may recognize which channel provides a corresponding program.

If the 3D broadcast service is not provided, or if the user views video data in a 2D mode, the broadcast receiver decodes only a stream corresponding to PID_P, and displays the decoded stream.

If the 3D broadcast service is provided, or if the user views video data in a 3D mode, the broadcast receiver extracts a video stream corresponding to PID_P and another video stream corresponding to PID_S, decodes and processes the extracted primary video data and the extracted secondary video data, and outputs the processed video data.

Figure 9:
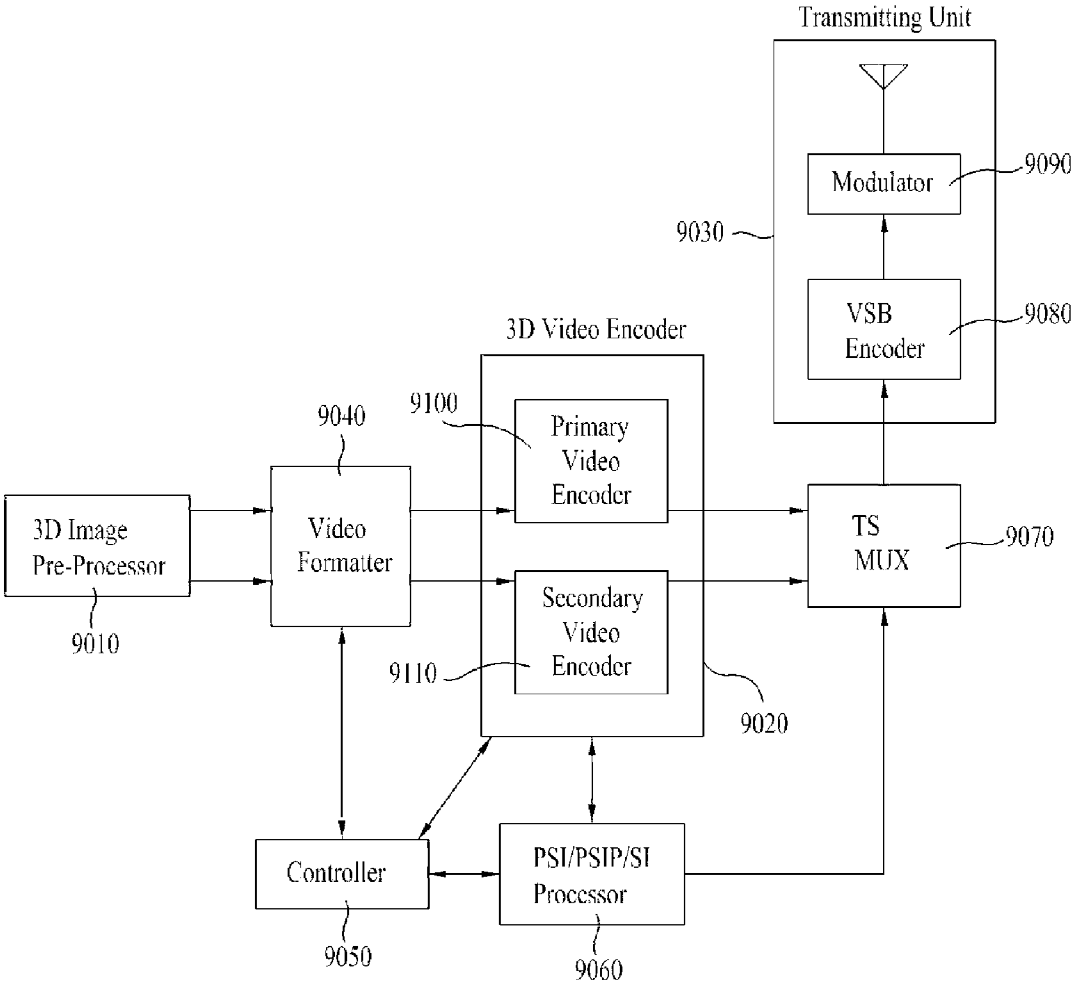
FIG. 9 is a block diagram illustrating a broadcast transmitter according to one embodiment of the present invention.

FIG. 9 is a block diagram illustrating a broadcast transmitter according to one embodiment of the present invention.

Referring to FIG. 9, the broadcast transmitter includes a 3D image pre-processor 9010, a 3D video encoder 9020, a transmitting unit 9030, a video formatter 9040, a controller 9050, a PSI/PSIP/SI processor 9060 serving as a system information processor, and a TS multiplexer (TS MUX) 9070. The 3D video encoder 9020 may further include a primary video encoder 9100 and a secondary video encoder 9110. The transmitting unit 9030 may further include a VSB encoder 9080 and a modulator 9090.

The 3D image pre-processor 9010 performs image processing on a stereoscopic image, and outputs primary video data of two viewpoints and secondary video data of such two viewpoints.

The video formatter 9040 formats received video data upon receiving a control signal from the controller 9050. The video formatter 9040 receives full-resolution primary video data and full-resolution secondary video data, such that it can perform resizing on both the primary video data and the secondary video data, or can selectively perform resizing on any of the primary video data and the secondary video data at half resolution. If the primary video data and the secondary video data are transmitted at full resolution, the video formatter 9040 may also bypass two video data (i.e., primary video data and secondary video data) without resizing the two video data.

The 3D video encoder 9020 may encode each of the primary video data and the secondary video data according to a coding scheme decided by the controller 9050.

The system information processor 9060 receives information, needed for processing 3D video data that includes video data encoding information and video data formatting information, from the controller 9050, the encoder 9020, and the video formatter 9040, generates system information, and outputs the generated system information.

The TS multiplexer 9070 receives primary video data, secondary video data, and system information, multiplexes the received video data and the received system information, and outputs the multiplexed result. A transport stream generated from the TS multiplexer 9070 is received at the transmitting unit 9030, such that the transmitting unit 9030 transmits the transport stream as a broadcast signal.

The transmitting unit 9030 may include a VSB encoder 9080 for performing VSB encoding and a modulator 9090 as an example, and may transmit a broadcast signal using different transmission schemes according to a broadcast transmission/reception standard.

Figure 10:
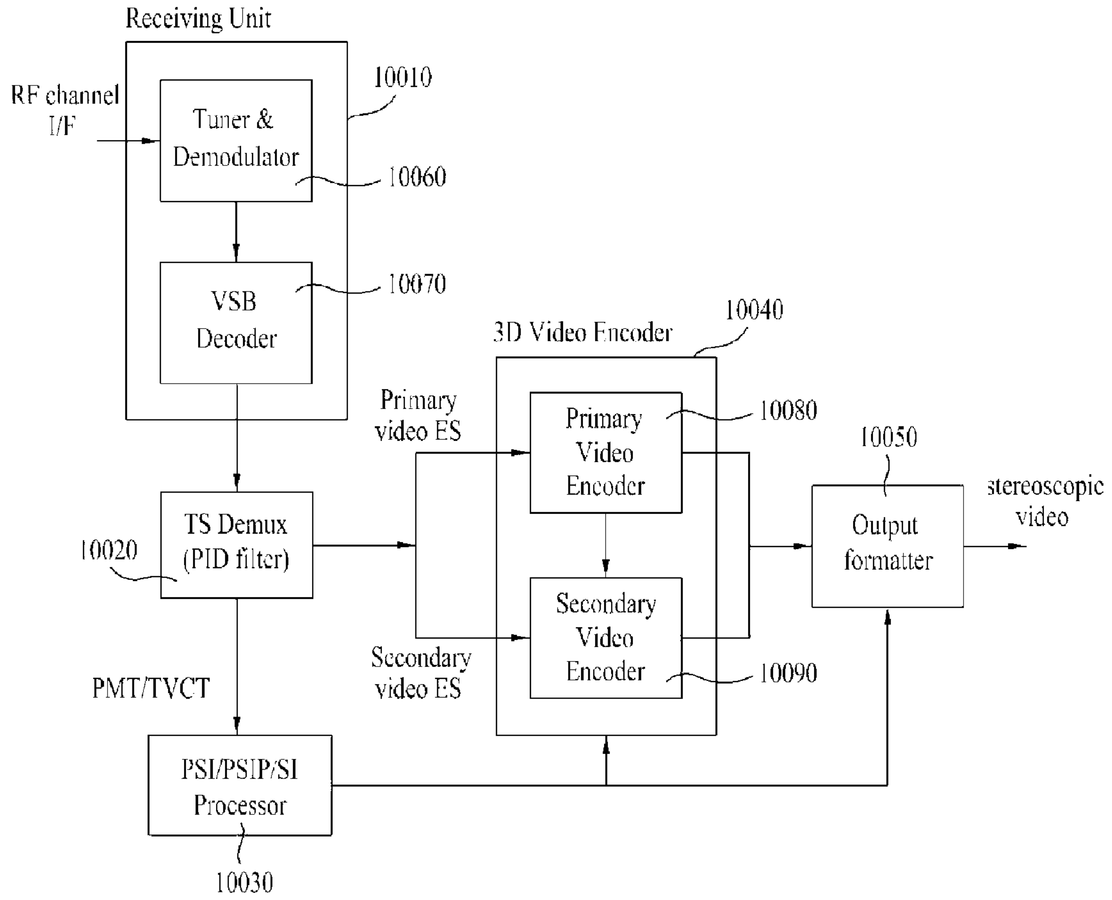
FIG. 10 is a block diagram illustrating a broadcast receiver according to one embodiment of the present invention.

FIG. 10 is a block diagram illustrating a broadcast receiver according to one embodiment of the present invention.

Referring to FIG. 10, the broadcast receiver includes a receiving unit 10010, a TS demultiplexer (TS Demux) 10020 serving as a PID filter, a PSI/PISP/SI processor 10030 serving as a system information processor, a 3D video decoder 10040, and an output formatter 10050. The receiving unit 10010 may further include a tuner & demodulator 10060 and a VSB decoder 10070. The 3D video decoder 10040 may further include a primary video decoder 10080 and a secondary video decoder 10090.

The broadcast receiver may receive a broadcast signal through the receiving unit 10010.

The TS demultiplexer (TS Demux) 10020 extracts video data, system information, and the like from the broadcast signal through the filtering process, and outputs the extracted result.

The system information processor 10030 receives system information from the TS demultiplexer 10020, parses the received system information, and obtains 3D video composition information. The broadcast receiver determines whether a 3D broadcast service is provided through the system information processor 10030. The broadcast receiver determines whether the 3D broadcast service is provided, and commands the TS demultiplexer 10020 to output primary video data and secondary video data according to the determined result.

The 3D video decoder 10040 obtains 3D video composition information from the system information processor 10030, such that it decodes primary video data and secondary video data according to the obtained 3D video composition information.

The output formatter 10050 may process the primary video data and the secondary video data according to 3D video composition information acquired from the system information processor 10030, and output the 3D video data according to the processed result. The output formatter 10050 may perform a variety of video data processes (e.g., a resizing process caused by filtering, a video formatting process, a frame rate conversion process, etc.) on at least one of primary video data and secondary video data according to the 3D video composition information.

The output formatter 10050 may perform resizing according to resizing information (or filter information) contained in the received 3D video composition information. The resizing information may include filter type information. In this case, attributes and the like of a filter corresponding to a given filter type may be stored in the output formatter 10040 or a storage medium not shown in FIG. 10.

Although the transmitter shown in FIG. 9 and the receiver shown in FIG. 10 have been disclosed on the basis of their constituent components, individual constituent components of the transmitter and the receiver can carry out the methods illustrated in FIGS. 7 and 8, and can also carry out various embodiments of the present invention.

The method disclosed in the present invention may be implemented in the form of program commands executable by a variety of computer means, and recorded on a computer-readable recording medium. The computer-readable recording medium may include program commands, data files, data structures, etc. individually or in combination. The program commands recorded on the medium may be ones specially designed and configured for the present invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language codes that may be executed by a computer using an interpreter, etc., as well as machine language codes such as those produced by a compiler. The above-stated hardware devices may be configured to operate as one or more software modules to perform the operation of the present invention, and vice versa.

Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

MODE FOR THE INVENTION

Various embodiments have been described in the best mode for carrying out the invention.

INDUSTRIAL APPLICABILITY

As apparent from the above description, embodiments of the present invention may be wholly or partially applied to a digital broadcasting system.

The broadcast receiver can process 3D video data such that a 3D effect intended by a 3D broadcast service provider is reflected in the 3D broadcast service. The broadcast receiver can effectively provide a 3D broadcast service simultaneously while minimizing the effect on a conventional 2D broadcast service.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A three dimensional (3D) video data processing method in a broadcast transmitter, the method comprising:

encoding, by an encoder, 3D video data, the 3D video data being rendered by a first video stream and a second video stream in separate video streams, wherein the first video stream carries primary video data for a first image and the second video stream carries secondary video data for a second image;

generating, by a system information processor, system information comprising 3D video composition information about the 3D video data;

multiplexing, by a multiplexer, the system information and the 3D video data; and transmitting, by a transmitting unit, a broadcast signal carrying the 3D video data and the system information, wherein the 3D video composition information includes first information on resolution of a corresponding video stream for the 3D video data, the 3D video composition information is included in a Program Map Table (PMT) or Terrestrial Virtual Channel Table (TVCT) contained in the system information, the 3D video composition information further includes second information indicating that the primary video data or the secondary video data can be displayed as a 2D image, the 3D video composition information further includes third information indicating whether or not the first image is a left image or a right image, and the first information includes at least one of a horizontal and vertical resolution for the corresponding 3D video data.

2. The 3D video data processing method according to claim 1, wherein a value of the first information indicates any one of a full resolution, a coded resolution which has ¾ of full resolution, a coded resolution which has ⅔ of full resolution and a coded resolution which has ½ of full resolution for the corresponding video stream.

3. A three dimensional (3D) video data processing method in a broadcast receiver, the method comprising:

receiving, by a receiving unit, a broadcast signal including 3D video data and system information comprising 3D video composition information about the 3D video data, the 3D video data being rendered by a first video stream and a second video stream in separate video streams, wherein the first video stream carries primary video data for a first image and the second video stream carries secondary video data for a second image;

obtaining, by a system information processor, 3D video composition information from the system information;

decoding, by a decoder, the 3D video data according to the 3D video composition information; and formatting and outputting, by an output formatter, the decoded 3D video data wherein the 3D video composition information includes first information on resolution of a corresponding video stream for the 3D video data, the 3D video composition information is included in a Program Map Table (PMT) or Terrestrial Virtual Channel Table (TVCT) contained in the system information, the 3D video composition information further includes second information indicating that the primary video data or the secondary video data can be displayed as a 2D image, the 3D video composition information further includes third information indicating whether or not the first image is a left image or a right image, and the first information includes at least one of a horizontal and vertical resolution for the corresponding 3D video data.

4. The 3D video data processing method according to claim 3, wherein a value of the first information indicates any one of a full resolution, a coded resolution which has ¾ of full resolution, a coded resolution which has ⅔ of full resolution and a coded resolution which has ½ of full resolution for the corresponding video stream.

5. A broadcast transmitter comprising:

an encoder to encode 3D video data which carries a first image and a second image in separate video streams, the 3D video data being rendered by a first video stream and a second video stream in separate video streams, wherein the first video stream carries primary video data for a first image and the second video stream carries secondary video data for a second image;

a system information processor to generate system information comprising 3D video composition information about the 3D video data;

a multiplexer to multiplex the system information and the 3D video data; and a transmitting unit to transmit a broadcast signal carrying the 3D video data and the system information, wherein the 3D video composition information includes first information on resolution of a corresponding video stream for the 3D video data, the 3D video composition information is included in a Program Map Table (PMT) or Terrestrial Virtual Channel Table (TVCT) contained in the system information, the 3D video composition information further includes second information indicating that the primary video data or the secondary video data can be displayed as a 2D image, the 3D video composition information further includes third information indicating whether or not the first image is a left image or a right image, and the first information includes at least one of a horizontal and vertical resolution for the corresponding 3D video data.

6. The broadcast transmitter according to claim 5 wherein a value of the first information indicates any one of a full resolution, a coded resolution which has ¾ of full resolution, a coded resolution which has ⅔ of full resolution and a coded resolution which has ½ of full resolution for the corresponding video stream.

7. A broadcast receiver comprising:

a receiving unit to receive a broadcast signal carrying three dimensional (3D) video data and system information comprising 3D video composition information about the 3D video data, the 3D video data being rendered by a first video stream and a second video stream in separate video streams, wherein the first video stream carries primary video data for a first image and the second video stream carries secondary video data for a second image;

a system information processor to obtain 3D video composition information from the system information;

a decoder to decode the 3D video data according to the 3D video composition information; and an output formatter to format and output the decoded 3D video data, wherein the 3D video composition information includes first information on resolution of a corresponding video stream for the 3D video data, the 3D video composition information is included in a Program Map Table (PMT) or Terrestrial Virtual Channel Table (TVCT) contained in the system information, the 3D video composition information further includes second information indicating that the primary video data or the secondary video data can be displayed as a 2D image, the 3D video composition information further includes third information indicating whether or not the first image is a left image or a right image, and the first information includes at least one of a horizontal and vertical resolution for the corresponding 3D video data.

8. The broadcast receiver according to claim 7, wherein a value of the first information indicates any one of a full resolution, a coded resolution which has ¾ of full resolution, a coded resolution which has ⅔ of full resolution and a coded resolution which has ½ of full resolution for the corresponding video stream.

* * * * *